United States Patent
Manwaring et al.

(10) Patent No.: US 7,077,432 B2
(45) Date of Patent: Jul. 18, 2006

(54) STEERING COLUMN ASSEMBLY HAVING BREAK-AWAY DEVICE

(75) Inventors: Marvin V. Manwaring, Clio, MI (US); Richard K. Riefe, Saginaw, MI (US); Ravindra Jwalapathy, Saginaw, MI (US); Ray G. Armstrong, Bay City, MI (US); Melvin L. Tinnin, Clio, MI (US)

(73) Assignee: Delphi Technologies, Inc., Troy, MI (US)

( * ) Notice: Subject to any disclaimer, the term of this patent is extended or adjusted under 35 U.S.C. 154(b) by 259 days.

(21) Appl. No.: 10/674,620

(22) Filed: Sep. 30, 2003

(65) Prior Publication Data

US 2005/0067825 A1    Mar. 31, 2005

(51) Int. Cl.
*B62D 1/11*    (2006.01)

(52) U.S. Cl. .................... 280/777; 74/473.31

(58) Field of Classification Search ............... 280/777, 280/779, 748, 750; 74/473.1, 473.3, 473.31, 74/473.32, 492, 493
See application file for complete search history.

(56) References Cited

U.S. PATENT DOCUMENTS

| | | | | |
|---|---|---|---|---|
| 3,368,421 A | * | 2/1968 | Hass et al. ..................... 74/493 |
| 3,665,778 A | | 5/1972 | Bohan et al. .................. 74/492 |
| 3,707,095 A | * | 12/1972 | Uhlenhaut et al. .......... 74/473.3 |
| 3,750,492 A | | 8/1973 | Holmes, Jr. .................... 74/523 |
| 4,616,522 A | | 10/1986 | White et al. ................... 74/492 |
| 5,052,715 A | | 10/1991 | Ervin et al. ................. 280/775 |
| 5,090,730 A | | 2/1992 | DuRocher et al. .......... 280/775 |
| 5,460,096 A | | 10/1995 | Kothe ........................ 102/530 |
| 5,737,970 A | | 4/1998 | Asbrand et al. ............... 74/492 |
| 5,845,536 A | | 12/1998 | Certeza ........................ 74/473 |
| 5,988,680 A | | 11/1999 | Wier ........................... 280/806 |
| 6,029,536 A | * | 2/2000 | Sugiyama ................. 74/473.31 |
| 6,168,202 B1 | | 1/2001 | Stevens ....................... 280/737 |
| 6,273,466 B1 | | 8/2001 | Suzuki et al. ............... 280/748 |
| 6,327,928 B1 | | 12/2001 | Bowerman et al. ........... 74/473 |
| 6,357,794 B1 | | 3/2002 | DuRocher .................... 280/777 |
| 6,367,840 B1 | * | 4/2002 | Duval et al. ................. 280/777 |
| 6,419,269 B1 | | 7/2002 | Manwaring et al. ........ 280/775 |
| 6,530,585 B1 | | 3/2003 | Howard .................... 280/89.11 |
| 6,578,872 B1 | | 6/2003 | Duval et al. ................. 280/777 |
| 2001/0037700 A1 | * | 11/2001 | Nishimura et al. ......... 74/473.3 |
| 2002/0073798 A1 | | 6/2002 | Ryne et al. .................... 74/492 |
| 2002/0167157 A1 | | 11/2002 | Matsumoto et al. ......... 280/777 |
| 2003/0085560 A1 | | 5/2003 | Shibayama ................. 280/777 |

FOREIGN PATENT DOCUMENTS

| | | |
|---|---|---|
| JP | 2000 177602 | 6/2000 |
| JP | 2002 002322 | 1/2002 |

* cited by examiner

*Primary Examiner*—David R. Dunn
*Assistant Examiner*—Drew J. Brown
(74) *Attorney, Agent, or Firm*—Michael D. Smith

(57) ABSTRACT

The steering column assembly includes a housing having a longitudinal axis, a support member supported by the housing for movement about a shift axis, and a shift lever operatively connected to the support member and extending radially from the shift axis for shifting movement in a limited space. The present invention includes a break-away device having a shear container that extends through a translating bracket and the support member for limiting movement of the shift lever upwardly toward a parallel relationship with the shift axis and for releasing the shift lever for the movement toward the parallel relationship in response to a crash condition.

6 Claims, 3 Drawing Sheets

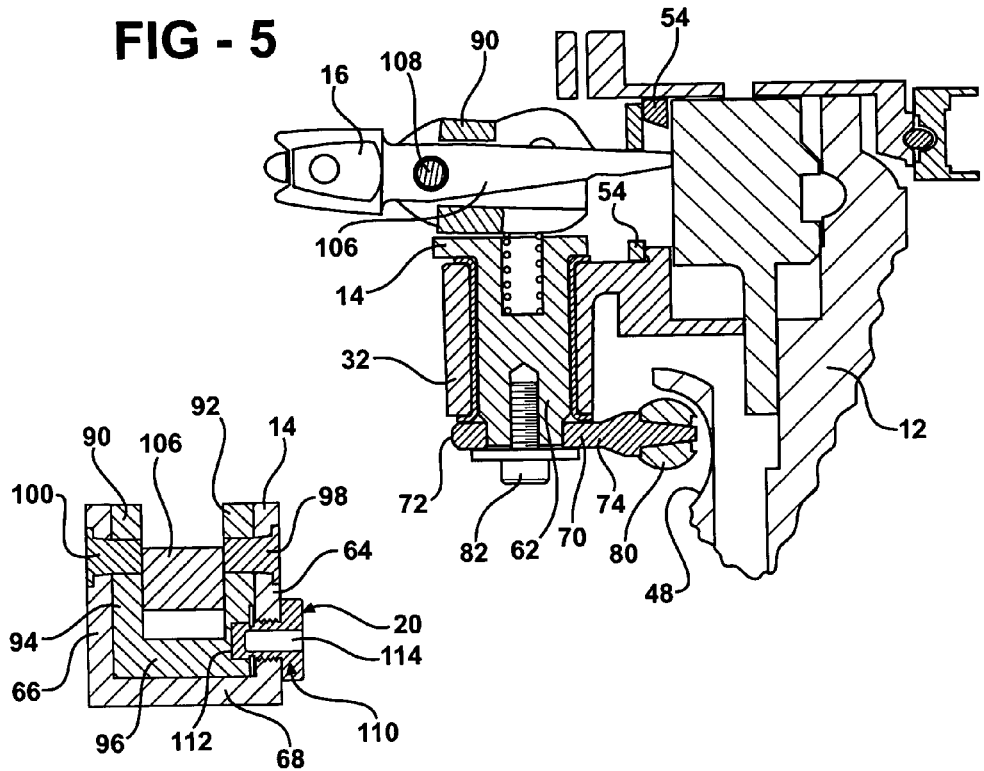
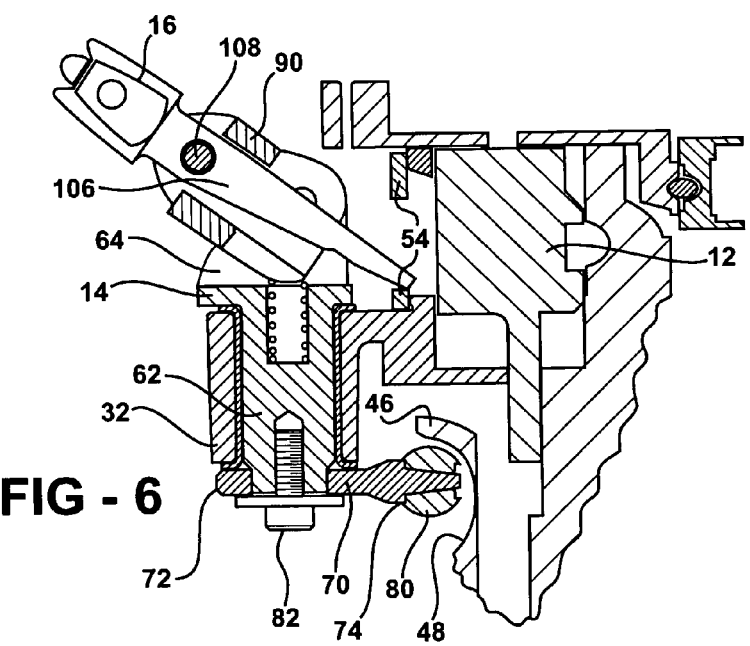

STEERING COLUMN ASSEMBLY HAVING BREAK-AWAY DEVICE

BACKGROUND OF THE INVENTION

1. Field of the Invention

The subject invention relates to an energy absorbing steering column assembly for a vehicle, and more particularly to a mechanism of a shift lever assembly of the steering column that is capable of reducing an impact on a driver and improving energy-absorption characteristics of the steering column assembly.

2. Description of the Prior Art

Contemporary automobiles are equipped with numerous safety features that include air bags and energy absorbing devices connected to a steering column assembly. Energy absorption devices include mechanisms that permit a controlled collapse of the steering column, wherein the air bags, mounted on a wheel of the steering column assembly, are designed to deploy in the event of a collision to provide protection to the driver. In addition to the airbag, adjustable position columns are typically fitted with energy absorbing devices including energy absorbing straps or the like, that allow the steering column to collapse during a collision at a controlled rate when impacted by the driver to offer additional protection to the driver.

Differences in the steering column assembly designs include a fixed column assembly, a tilt column assembly, and a telescoping column assembly. These columns include a housing to engage various components of the steering column assembly including and not limited to warning flasher control devices, turn signal switches, ignition key port, windshield and washer control levers, an anti-theft device, and a shift lever.

The art is replete with various designs of steering column assembly. The U.S. Pat. Nos. 3,750,492 to Holmes, 6,273,466 to Suzuki et al., 6,419,269 to Manwaring et al., the U.S. Patent Application Publication Nos. 2002/0073798 to Ryne et al., 2003/0085560 to Shibayama, and Japanese Patent Nos. 00177602 JP to Miki et al. and 02002322 JP to Miki et al.

The Japanese Patent No. 00177602 JP to Miki et al. teaches a steering column assembly including an operation mechanism part operated by a shift lever fixed to the steering column, wherein both the steering column and the operation mechanism part are covered with a column cover. The steering column includes a metal plate having an impact absorbing plastic part connected thereto and defining a gap therebetween. During the collision, a driver's knee collides with the plastic metal plate that plastically deforms and absorbs energy.

The Japanese Patent No. 02002322 JP to Miki et al. teaches a steering column assembly including a support member secured to a bracket and designed for supporting a rear end portion of a shift lever in a manner allowing the rear end portion to freely rotate about an axis thereof. The support member is integrally provided with a mounting flange mounted to the mounting surface of the bracket being approximately parallel to the axis of the rear end portion of the shift lever. The mounting flange includes a fragile portion corresponding to the tip of the rear end portion of the shift lever. In the event of a collision, the driver's knees makes a secondary contact with the shift lever in a head-on collision, thereby breaking the mounting flange to reduce the load on the knees. The aforementioned designs mitigate impact to a driver's knee by a secondary collision without narrowing front space of a driver's seat. Hence practicable, these designs do not improve enough the crashworthiness response and effectiveness of energy absorption system of the vehicle.

There is a constant need in the area of a steering column assembly design to provide a gear shift assembly capable of reducing impact on a driver and improving energy-absorption characteristics of the steering column assembly by pivoting a lever of the gear shift assembly in the direction transverse to the direction of the steering column assembly during the collision of the vehicle thereby improving the crashworthiness response and effectiveness of energy absorption system of the vehicle and reducing the likelihood of injury of the driver during the collision of the vehicle.

BRIEF SUMMARY OF INVENTION

A steering column assembly includes a housing having a longitudinal axis, a support member supported by said housing for movement about a shift axis, and a shift lever operatively connected to the support member and extending radially from the shift axis for shifting movement in a limited space. The steering column assembly includes a break-away device interconnecting the shift lever and the support member for limiting movement of the shift lever upwardly toward a parallel relationship with the shift axis and for releasing the shift lever for the movement toward the parallel relationship in response to a crash condition.

An advantage of the present design is to provide a steering column assembly capable of reducing impact on a driver and improving energy-absorption characteristics of the steering column assembly.

Still another advantage of the present invention is to provide a mechanism of the shift lever assembly to allow a shift lever, which extends from the shift lever assembly in a cantilevered fashion, to break away during a collision into the direction transverse to the direction of a collapse of the steering column assembly, thereby improving the crashworthiness response and effectiveness of energy absorption system of the vehicle and reducing the likelihood of injury of the driver.

BRIEF DESCRIPTION OF THE DRAWINGS

Other advantages of the present invention will be readily appreciated as the same becomes better understood by reference to the following detailed description when considered in connection with the accompanying drawings wherein:

FIG. 4 is a cross sectional view of the translating bracket disposed in a tubular portion of a support member and a shear bolt extending therethrough presenting a locking engagement therebetween;

FIG. 5 is a partial cross sectional view of the steering column assembly; and

FIG. 6 is another partial cross sectional view of the steering column assembly.

DETAILED DESCRIPTION OF THE INVENTION

Figure 1:
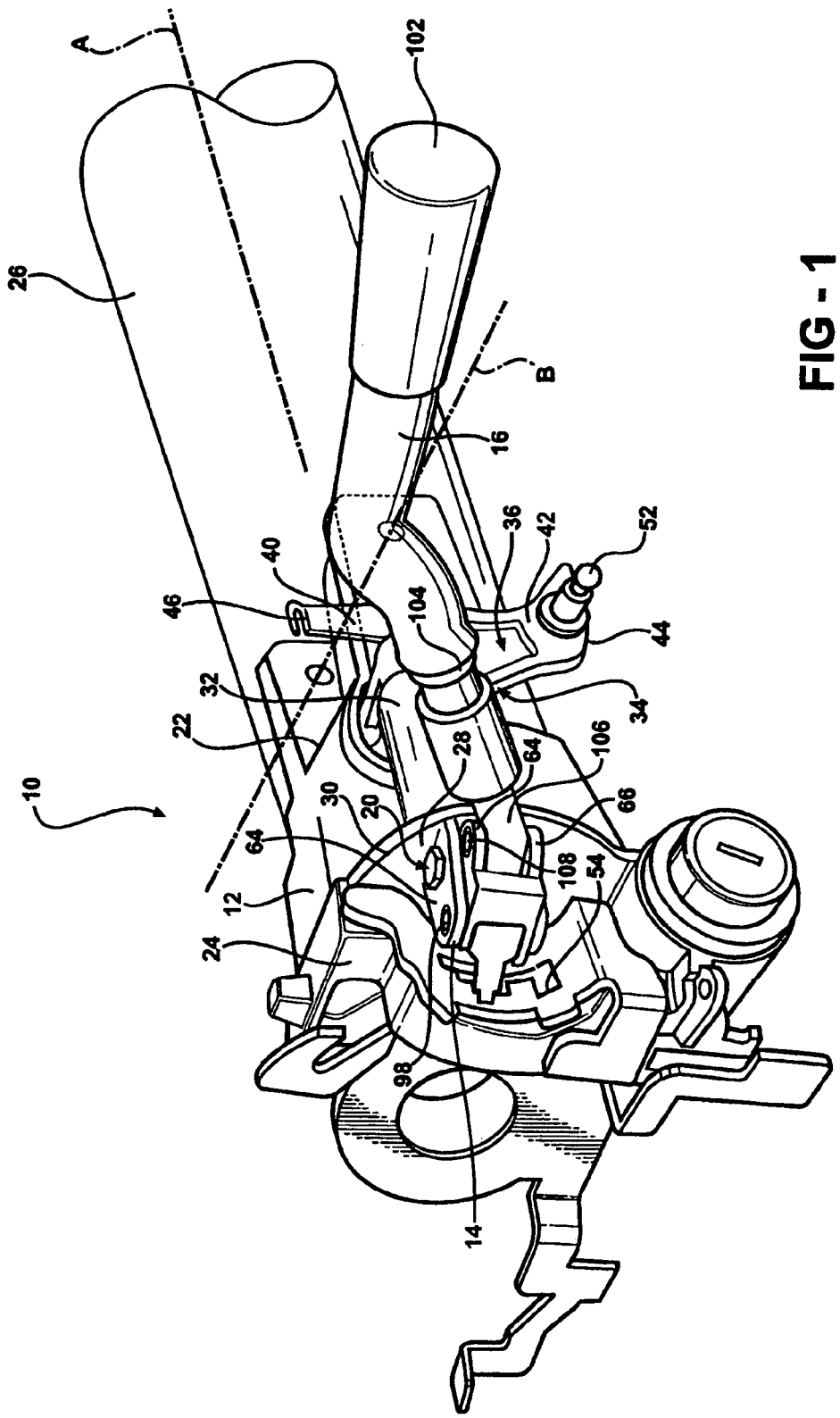
FIG. 1 is a perspective view of a steering column assembly having a break-away device.
Figure 2:
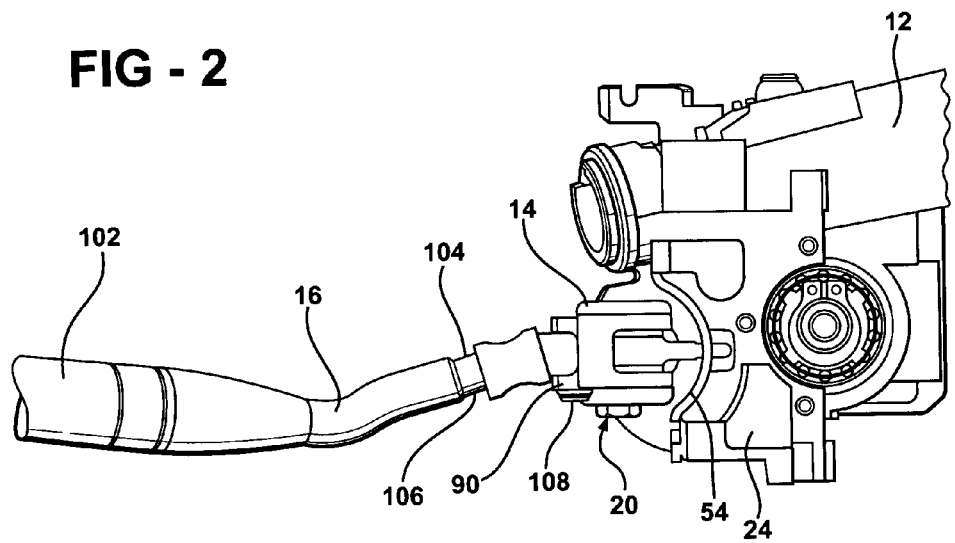
FIG. 2 is a front view of the steering column assembly having the break-away device.
Figure 3:
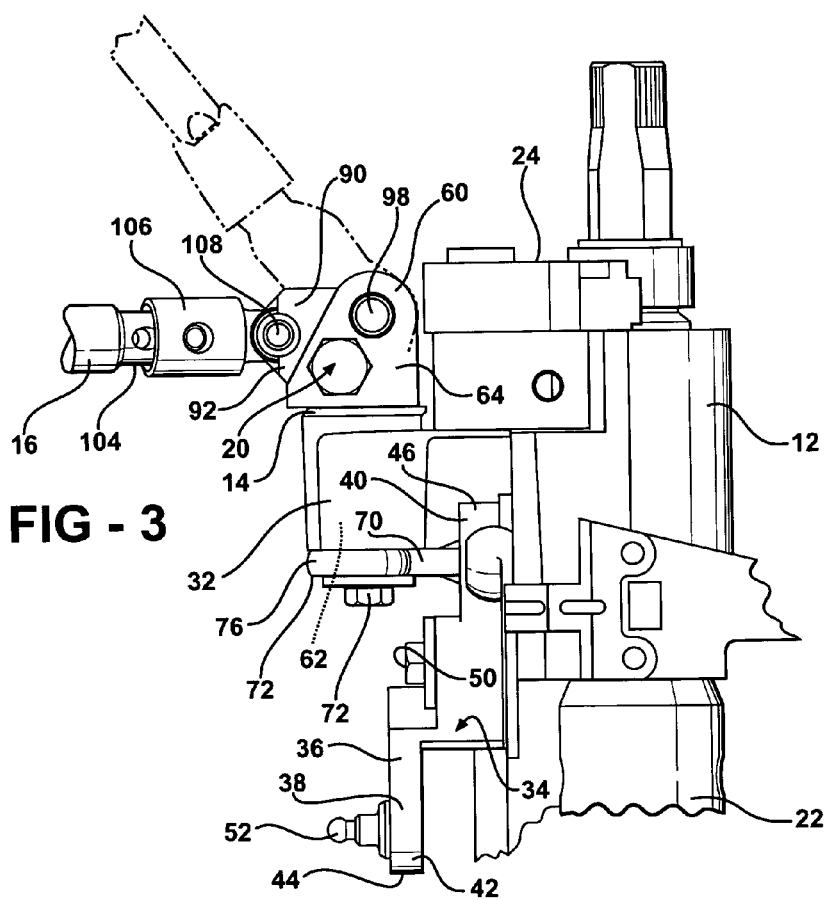
FIG. 3 is a top view of the steering column assembly having the break-away device.

Referring to the FIGS. 1 through 6, wherein like numerals indicate like or corresponding parts throughout the several views, a steering column assembly of the present invention is generally shown at 10.

The steering column assembly 10 includes a housing 12 having a longitudinal axis A, a support member 14 supported by the housing 12 for movement about a shift axis, and a shift lever 16 operatively connected to the support member 14 and extending radially from the shift axis for shifting movement in a limited space. The steering column assembly 10 includes a break-away device, generally indicated at 20, interconnecting the shift lever 16 and the support member 14 for limiting movement of the shift lever 16 upwardly toward a parallel relationship with the shift axis and for releasing the shift lever 16 for the movement toward the parallel relationship in response to a crash condition.

While either a tilting steering column assembly design or telescoping steering column assembly design (not shown) may adapt the break-away device 20 of the present invention, both being well known to those skilled in the art, only the tilting steering column assembly design 10 shall be described further. The tilting steering column assembly 10 includes the housing 12, i.e. the upper housing 12 having terminal ends 22, 24 and a lower housing 26 pivotally coupled to the upper housing 12 to permit the upper housing 12 to tilt with respect to the lower housing 26 about an axis B. The upper housing 12 includes a flange 28 integral with and extending from the upper housing 12 to a peripheral edge 30. The lower housing 26 is pivotably coupled to one of the terminal ends 22 of the upper housing 12. The steering column assembly 10 includes a boss 32 of a generally tubular configuration integral with and extending from the peripheral edge 30 in a cantilevered fashion. The boss 32 is spaced from the upper housing 12 and extends parallel to the longitudinal axis A.

The steering column assembly 10 includes a cam assembly, generally indicated at 34, disposed between the boss 32 and the upper housing 12. The cam assembly 34 includes a crank member, generally indicated at 36, having a body 38 including two opposite arms 40, 42 integral with and extending therefrom in a cantilevered fashion to a distal ends 44, 46, respectively, and an elongated slot 48 defined in the body 38. The cam assembly 34 includes a fastener 50 extending through the crank member 36 to connect the crank member 36 to the housing 12. One of the arms 42 includes a slug 52 for connecting with a wire (not shown). Those skilled in the art will appreciate that this wire, attached to the slug 52, extends from one of the arms 42 and is operatively connected with a transmission mechanism (not shown), upon pivotable rotation of the crank member 36 causes the transmission in the vehicle to shift to the appropriate position. The steering column assembly 10 includes a gate member 54 defined within the housing 12. The gate member 54 includes a plurality of cells.

The support member 14 includes a tubular portion 60 and a cylindrical portion 62. The tubular portion 60 is disposed within the boss 32 of the upper housing 12. The tubular portion 60 of the support member 14 has upper 64 and lower 66 sidewalls adjacent and parallel one the other and being interconnected by a bottom wall 68 of the tubular portion 60. A shifter pin 70 of the support member 20 extends perpendicularly through the tubular portion 60 of the support member 14. The shifter pin 70 has first 72 and second 74 ends, wherein the first end 72 is further defined by a circular plate 76 having an opening defined therein. The second end 74 includes a ball 80 to engage within the elongated slot 48 of the body 38 of the cam device. The support member 14 includes a screw 82 that extends through the opening of the circular plate 76 to the support member 14 to connect the shifter pin 70 thereto.

The steering column assembly 10 includes a translating bracket 90 disposed within the tubular portion 60 of the support member 14. The translating bracket 90 has top 92 and bottom 94 sidewalls adjacent and parallel one the other and a bottom 96 interconnecting the top 92 and bottom 94 side walls. The translating bracket 90 is pivotably connected to the support member 14 by first 98 and second 100 pivoting pins and operatively supporting the shift lever 16. The first pivoting pin 98 extends through the upper 64 and top 92 sidewalls sandwiched one with the other. The second pivoting pin 100 extending through the lower 66 and bottom 94 sidewalls sandwiched one with the other. The first 98 and second 100 pivoting pins are aligned with respect to one the other.

The shift lever 16 operatively connected to the support member 20 of the steering column assembly 10 includes a generally cylindrical configuration and has terminal ends 102, 104. The shift lever 16 includes a clevis member 106 attached to one of the terminal end 104 of the shift lever 16. The shift lever 16 is disposed between the top 92 and bottom 94 side walls of the translating bracket 90 and is pivotably connected therebetween by a central pin 108.

The break-away device 24 includes a shear container or bolt, generally indicated at 110, having a shell 112, which extends through the upper side wall 64 of the tubular portion 60 of the support member 14 and the top side wall 92 of the translating bracket 90 sandwiched one with the other. The shear bolt 110 is spaced from the first pivoting pin 98 to present a locking engagement therebetween, as best shown in FIG. 6. The shear bolt 110 includes a pyrotechnic fuse or charge 114 disposed within the shell 112. The shear bolt 110 bolt is connected to a sensor device (not shown) by an electrical lead or electric wire (not shown). The sensor device includes an electrical circuit (not shown) with a power source and a switch. The switch is part of the sensor device. The sensor device senses the vehicle condition in a case of the crash to indicate the occurrence of the crash. When the steering column moves into the dash board during the crash, the switch is closed thereby directing the electric current through the electric lead or wire through the shear bolt 110 to ignite the pyrotechnic charge 114. When the pyrotechnic charge 114 is ignited, it produces combustion products including heat. The heat ruptures or severs the shell 112 of the shear bolt 110 engaged within the support member 14 and the translating bracket 90. The shear bolt 110, being sheared off in the translating bracket 90 and the support member 14, releases the translating bracket 90 from the support member 14. When the shift lever 16 meets the dash board during the collision of the vehicle, the translating bracket 90 engaging the shift lever 16, pivoting from the locking engagement with the support member 20 and releases the shift lever 16 for parallel relationship in response to the crash condition.

Those skilled in the art will appreciate that other designs of the break-away device 24 having the shear bolt 110, as disclosed in the present invention, may be used for releasably holding the shift lever 16 against pivotal movement to the broken chain line collapse position during normal operation of the vehicle, which would operate in the crash event to release the shift lever 16 for pivoting movement about the pivoting pins 98, 100. For example, the other designs of the alternative embodiment of the break-away device 24 include a pin without an explosive charge, a plastic shearable capsule. Still another alternative embodiment of the break-away device include a solenoid-activated retaining pin, which would normally hold the shift lever 16 against pivoting about the pivoting pins 98, 100. During the crash, the solenoid-activated retaining pin releases the shift lever 22 toward pivoting.

The present design of the invention subject reduces impact on the driver and improves energy-absorption characteristics of the steering column assembly 10. As appreciated by those skilled in the art, the upper housing 12 of the tilting steering column assembly 10 or a bracket of a telescoping steering column assembly, as shown in the aforementioned U.S. Pat. No. 6,419,269 to Manwaring et al., includes breakaway capsules (not shown) engaged within each of the side walls. These breakaway capsules remain attached to a vehicle body frame (not shown). The predetermined force may occur during the collision. After separation of sidewalls of the bracket from the breakaway capsules, energy absorption straps disposed in and connected to the breakaway capsules control forward movement of an upper jacket of the telescoping steering column assembly. An anchor end of each strap is clamped to the sidewalls of the bracket by a strap fastener. The free end of each of the energy absorption straps passes through an energy absorption strap retainer. The strap retainers are secured to the breakaway capsules, respectively. As the straps pass through the strap retainers, the strap are bent into an arc and then restraightened to absorb energy. The design of the present invention presents the translating bracket 90 engaging the shift lever 16, wherein the translating bracket 90 releases the shift lever 16 for parallel relationship in response to the crash condition, improves the crashworthiness response and effectiveness of the energy absorption system of the vehicle, and reduces the likelihood of injury to the driver.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A steering column assembly for collapsing in the event of a collision, said steering assembly comprising:
    a housing having a longitudinal axis,
    a support member supported by said housing for rotary movement about a shift axis,
    a shift lever operatively connected to said support member and extending radially from said shift axis for shifting movement in a limited space to forcibly rotate said support member about said shift axis, and
    said steering column assembly characterized by a breakaway device interconnecting said shift lever and said support member for limiting movement of said shift in directions parallal to said shift axis under normal driving conditions and for automatically releasing said shift lever for collapsing movement toward parallel relationship with said shift axis in response to a crash condition.

2. A steering column assembly as set forth in claim 1 wherein said break-away device comprises a fuse responsive to an electrical crash condition signal.

3. A steering column assembly as set forth in claim 2 wherein said break-away device includes a shear container to hold said fuse disposed therein.

4. A steering column assembly as set forth in claim 3 including a translating bracket pivotably connected to said support member and operatively supporting said shift lever.

5. A steering column assembly as set forth in claim 4 wherein said shear container extends through said support member and said translating bracket to present a locking engagement therebetween for limiting movement of said shift lever toward parallel relationship with said shift axis.

6. A steering column assembly as set forth in claim 5 comprising:
    said housing having terminal ends,
    a flange integral with and extending from said housing to a peripheral edge,
    a lower housing being pivotably coupled to one of said terminal ends of said housing,
    a boss of a generally tubular configuration integral with and extending from said peripheral edge,
    said boss being spaced from and extending parallel to said housing,
    a cam assembly disposed between said boss and said upper housing,
    a crank member of said cam assembly including a body having two opposite arms extending therefrom in a cantilevered fashion, one of said arms including a slug for connecting with a wire,
    a bolt extending through said crank member to said housing pivotally connecting said crank member thereto,
    an elongated slot defined in said body,
    a gate member defined in said housing,
    a plurality of cells defined in said gate member,
    said support member being disposed within said boss of said housing,
    said support member including a cylindrical portion and a tubular portion,
    said tubular portion of said support member having upper and lower side walls adjacent and parallel one the other and being interconnected by a bottom wall of said tubular portion,
    a shifter pin extending perpendicularly through said tubular portion of said support member, said shifter pin having first and second ends,
    said first end being further defined by a circular plate having an opening defined therein and said second end including a ball to engage within said slot of said body of said cam assembly,
    a screw extending through said opening of said circular plate to said shifter pin to connect said shifter pin to said support member,
    a translating bracket disposed within said tubular portion of said support member,
    said translating bracket having top and bottom side walls adjacent and parallel one the other and a bottom interconnecting said top and bottom side walls,
    a first pivoting pin extending through said upper and top side-walls sandwiched one with the other,
    a second pivoting pin extending through said lower and bottom sidewalls sandwiched one with the other,
    said shear container extending through said upper and top side walls to present said locking engagement therebetween for limiting movement of said shift lever upwardly toward parallel relationship with said support member,
    said shift lever having a generally cylindrical configuration including terminal ends,
    a clevis member attached to one of said terminal ends of said shift lever and being disposed between said top and bottom side walls of said translating bracket, and
    a central pin extending through said top side wall, said clevis member and said bottom side wall of said translating bracket for selectively moving said clevis member between said slots of said gate member in different operational modes of said steering column assembly.

* * * * *